Figure 1:
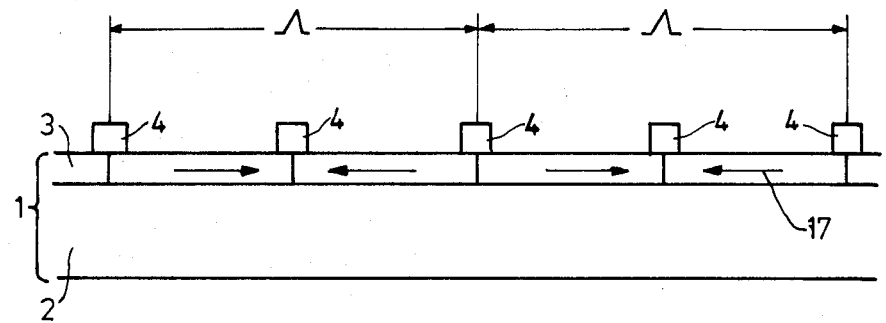

United States Patent [19]

Greiner et al.

[11] Patent Number: 4,497,007
[45] Date of Patent: Jan. 29, 1985

[54] MAGNETO-OPTICAL STORAGE PROCESS

[75] Inventors: Joachim Greiner, Ebenhausen; Burkhard Nippe, Munich, both of Fed. Rep. of Germany

[73] Assignee: Agfa-GEvaert Aktiengesellschaft, Leverkusen, Fed. Rep. of Germany

[21] Appl. No.: 357,828

[22] Filed: Mar. 12, 1982

[30] Foreign Application Priority Data

Mar. 18, 1981 [DE] Fed. Rep. of Germany ....... 3110572

[51] Int. Cl.³ .......................... G11B 5/32; G11B 9/00; G11C 11/42; G01D 15/06
[52] U.S. Cl. .................................. 360/114; 346/74.2; 365/10
[58] Field of Search ............... 360/114, 134, 131, 113; 365/8, 9, 10, 64; 340/149 A; 355/3 R, 3 CH; 369/119, 126; 346/74.2, 74.3

[56] References Cited

U.S. PATENT DOCUMENTS

| | | | |
|---|---|---|---|
| 3,521,257 | 7/1970 | Nelson | 360/114 |
| 3,561,863 | 2/1971 | Brewster | 355/3 |
| 3,696,352 | 10/1972 | Schilling | 360/114 |
| 3,761,645 | 9/1973 | Stancel et al. | 179/100.2 E |
| 3,778,791 | 12/1973 | Lewicki | 360/114 |
| 4,101,905 | 7/1978 | Hale et al. | 346/74.1 |
| 4,202,022 | 5/1980 | Imamura | 360/114 |
| 4,228,473 | 10/1980 | Himuro | 365/10 |

OTHER PUBLICATIONS

Patents Abstracts of Japan, vol. 4, No. 15(E-170), Feb. 5, 1980, No. 54-156516.

*Primary Examiner*—Robert Martin Kilgore
*Attorney, Agent, or Firm*—Connolly and Hutz

[57] ABSTRACT

This invention relates to a magneto-optical storage and playback process for travelling information carriers, by recording on a magnetizable information carrier (1) in the form of a tape, disc or roller while the carrier is in motion, said information carrier having information areas which are larger than 0.2 μm and smaller than 20 μm in one direction of the information plane, the process being carried out by the production of a geometrical structure (4) by the action of the magnetic fields of the recorded information on particles whose greatest length is less than 0.1 μm, preferably 0.02 μm, and by optical scanning of these structures in which light of wavelength 0.38 to 0.8 μm is diffracted on the surface of the moving information carrier (1) and diffraction images are produced which serve for the interpretation of the information.

28 Claims, 4 Drawing Figures

MAGNETO-OPTICAL STORAGE PROCESS

This invention relates to a process for recording and scanning information on magnetizable material, in particular on magnetizable layers.

The storage of information on a moving carrier consisting of a magnetizable material or at least containing a magnetizable layer is frequently employed nowadays. Examples include the storage of sound and images on magnetic tape and the fixing of data on storage discs as used in computer technology, etc.

The device used for recording the information on the carrier is the recording head. In most cases nowadays it consists of a soft magnetic annular core carrying a coil and having a fine gap, in which the recording field is produced by the information-carrying current flowing through the turns of the coil. The movement of the information carrier and the field fluctuations produced by the current fluctuations produce in the carrier a magnetic state with local fluctuations corresponding to the recorded information. One precondition for this is that the information carrier should have hard magnetic properties and hence a relatively high remanence and a relatively high coercivity field.

Scanning is, in most cases, carried out by an annular head working by induction, which is basically similar in construction to a sound recording head. The gap causes the leakage flux of the moving information carrier to permeate the soft magnetic core. The fluctuations in the flux induce a voltage at the ends of the coil corresponding to the information.

Cancellation of the information is effected by an alternating current supply to an erasing head which is also similar in construction to the sound recording head. The possibility of erasing information is one of the major advantages of magnetic recording. The heads are generally designed to touch the information carrier, with the result that signs of wear appear on the head and on the information carrier. In certain cases, e.g. in computer storage discs, a small distance is maintained between the head and the information carrier, but this results in a loss in sound reproduction which becomes progressively more pronounced the lower the wavelengths of the recording. It should be noted that even distances of 1 μm between the head and information carrier are sufficient to cause substantial loss of sound. Other processes apart from these most commonly employed methods of recording, scanning and erasing are also known but they are of less practical importance. Thus, for example, in one method of recording, the moving storage material is heated to a temperature above the Curie point and subsequently cooled in the magnetic field which carries the information.

The effect of the change in electrical resistance in the magnetic field, the Hall effect or scanning by the harmonic wave process (U.S. Pat. No. 3,364,496) have been proposed for sound reproduction. All scanning heads based on the above mentioned effects resemble the ring head in that the leakage field of the recording diminishes with distance from the information carrier. Some loss of information occurs if scanning is without contact.

Scanning processes which operate without loss due to distance make use of the magneto-optical Faraday or Kerr effects. The use of such processes has hitherto failed to become established because rotation of the plane of polarisation of a light beam by the leakage fields of the recording is so slight that it is very difficult to move the information carrier with the necessary degree of accuracy.

Methods of making the recordings of a magnetic information carrier directly visible are based on scanning the stationary carrier by the Bitter bands technique. This method was developed in the course of fundamental research into the possibilities of rendering the structure of magnetic domains visible. In this method, a suspension of soft magnetic particles is poured on to the highly polished surface of the sample to be investigated. The domains or rather the walls of the domains are rendered visible by the deposition of the particles in the leakage fields of the domain structure. Using a relationship of Kittel (Phys. Review 76, page 1527 (1949)), according to which the particle density of multi-domain images in a field H is defined by the equation:

$$p(H) = p(o) e^{\chi H^2 V / 2kT}$$

($\chi$ = effective susceptibility, V = particle volume, $p(o)$ = density in the field H = O), the contrast of the Bitter bands can be enhanced by superimposition of suitable external fields on the leakage fields of the domains. The density of particles in leakage fields is increased if the leakage fields are rectified with respect to the external field but decreased if the leakage fields are opposed to the external field.

The powder particles in the leakage fields of the recording accumulate in a similar manner when the recording on an information carrier is rendered visible. Here again, external magnetic fields may advantageously be employed to increase the contrast (N.H. Yeh, Coloured Bitter Patterns on Tape, Digests of the Intermag Conference in Boston 1980, Paper 23-6). Without external field, the period of the particle accumulations corresponds to one half of a recorded wavelength whereas in the external field it is to be associated with a whole wavelength.

Attempts have also been made to utilise the effect of particle accumulation in leakage fields of a recording so that the pigment particles used in the production of magnetic tapes could be used to represent the magnetic recording on magnetic tapes. These particles are not soft magnetic but have coercivity fields of approximately 24 KAm$^{-1}$.

In such a process which is used for the production of unerasable tapes and has been described in German Pat. No. 1 522 965, a magnetic suspension of the kind used for the production of a magnetic tape is poured on a magnetic tape carrying the recording. When the particles have arranged themselves in the leakage field of the recordings, a carrier layer is applied. The arrangement is then stripped from the original, and a representation of the recording is obtained as a local distribution of pigment particles.

In another process, which makes use of the pigment particles of the recording material, the recording is made on a magnetic tape having a soluble layer. The surface of the tape is then partly dissolved so that the magnetic particles become mobile and able to arrange themselves in the leakage fields. The recording becomes visible as a structural change in the surface. This process has been described by Guckenburg in "Technik der Magnetspeicher" by Prof. Dr. F. Winckel, Springerverlag 1960, pages 113-129.

Other methods have recently become known, in which the information carrier is kept stationary while the recordings are investigated by diffraction of the light at the grids formed by drying up of the Bitter patterns. According to N. H. Yeh, Coloured Bitter Patterns of Tape, Digests of the Intermag Conference in Boston 1980, Paper 23-6, this effect is used for carrying out spectrum analysis on the stationary recording. To enable diffraction to occur, the wavelengths of the recording and the size of the particles in the suspension must be of the order of the wavelength of light. The required wavelengths are obtained in video recordings.

As already mentioned above, in scanning heads in which the direct action of the leakage field of the recording on the scanning head is used, signs of wear occur on the head and on the carrier if scanning is carried out by direct contact whereas contact free scanning has the disadvantage of being accompanied by distance losses. Contact free scanning with a light beam using the Faraday or Kerr effect is insufficiently sensitive. Bitter heads for reproduction on the recorded information have hitherto been used on the stationary information carrier. The information may then be detected either directly by diffraction of the light or at the diffraction grid formed by the dried Bitter bands. In the first case, the only information detected is whether and in what manner a signal has been deposited. The second method may in addition be used to carry out a Fourier analysis of the recorded signal.

The problem therefore arises to provide a magnetic information carrier, a scanning arrangement and a process with a relative displacement between the information carrier and the scanning arrangement by which contact free scanning of sufficient sensitivity without losses due to distance can be obtained.

This problem may be solved by means of two processes taking place separately or simultaneously. Where the processes occur separately, areas of different magnetic states corresponding to the information to be recorded are produced in the homogeneous information carrier in a first step and fluctuations in the density of magnetic particles representing an optically legible reflection or transmission grid are produced in the second step by displacement or deposition of magnetic pigment particles in the leakage fields of the said areas. The dimensions of the recorded areas are preferably of the order of the wavelength of light, more specifically from $>0.2$ $\mu$m to $\Lambda<20$ $\mu$m in the direction of the information plane. Where the processes take place simultaneously, a recording field acts on a still liquid suspension of the information carrier containing soft magnetic or hard magnetic particles of the order of magnitude of ferro-fluid. A reflection or transmission grid is formed.

When the information carrier is in motion, the linear or two-dimensional diffraction grids produced as described above, which have grid constants depending upon the information recorded, are exposed in either a phase related or a phase free manner to white or monochromatic light with wavelengths which may extend from infra red to ultra violet (0.8 to 0.4$\mu$). The diffracted light, whose direction depends on the grid constants, is processed according to the information and converted, in particular back into electrical signals. The source of light may be a laser.

Thus, according to the present invention, there is provided a magneto-optical recording and playback process for travelling information carriers, characterised by (a) recording on a magnetizable information carrier in the form of a tape, disc or roller by modulating it during its movement with information areas which in one direction of the information plane are greater than 0.2 $\mu$m and smaller than 20 $\mu$m;

(b) geometrical production of a structure by the action of the magnetic fields of the recorded information on particles whose greatest longitudinal dimension is less than 0.1 $\mu$m, preferably 0.02 $\mu$m;

(c) optical scanning of these structures, by which light of wavelength 0.38 to 0.8 $\mu$m is diffracted on the surface of the moving information carrier and diffraction images are produced which serve for interpretation of the information.

Figure 2:
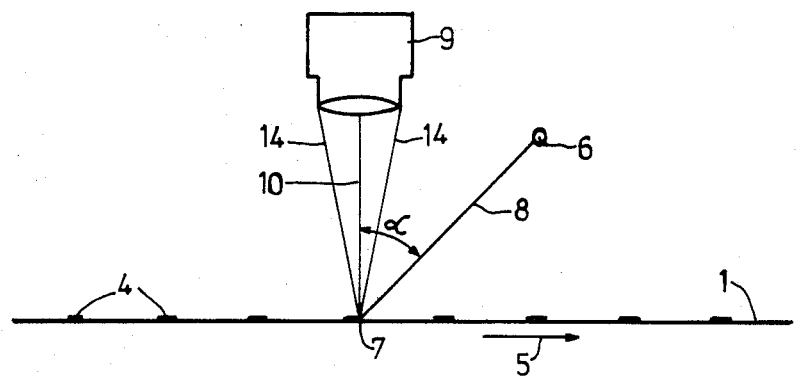
Figure 3:
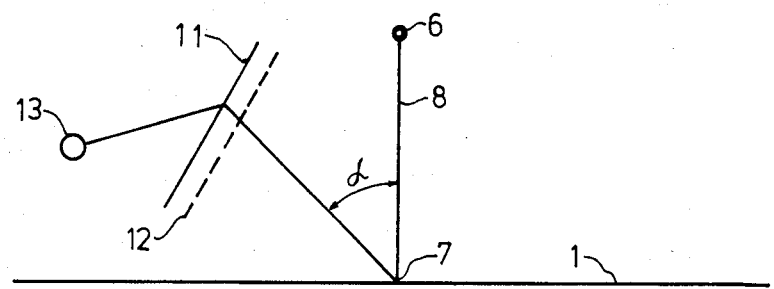
Figure 4:
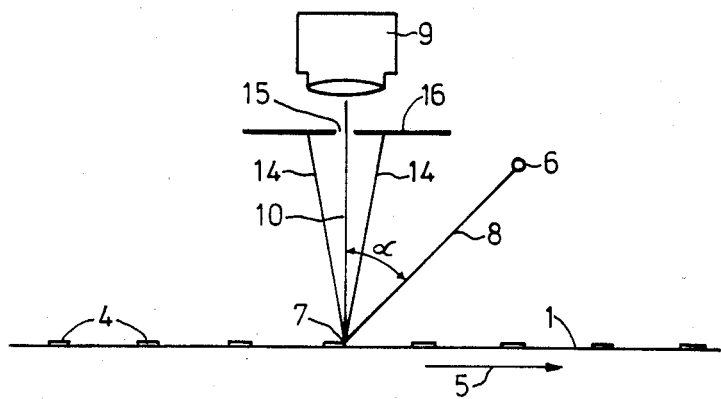

Embodiments of the present invention will now be described by way of example, with reference to the accompanying drawings, in which:

FIG. 1 represents an information carrier according to the invention with a magnetic grid, FIG. 2 represents a scanning apparatus according to the invention for monochromatic light, FIG. 3 is a schematic representation of monochromatic scanning, and FIG. 4 represents a scanning apparatus according to the invention for spectral irradiation.

FIG. 1 shows by way of example, a magnetic tape 1 as storage material which is obtained by the steps of the process. A magnetic layer 3 on which a wavelength $\Lambda$ has been recorded, is situated on a carrier foil 2. After application of a ferro-fluid suspension, a suspension of soft magnetic particles measuring ca. 0.02 $\mu$m, and evaporation of the liquid, elevations 4 are formed by the magnetic forces. These elevations 4 act as grid bars and are situated at a distance $\alpha$ $\Lambda/2=2\lambda$m and $\Lambda/2=3\lambda$m apart. Arrows 17 indicate the change in magnetization.

The basic principle of construction of a scanning apparatus according to the invention is shown, by way of example, in FIG. 2. The magnetic tape 1 carrying the information 4 in the form of a grid is displaced at velocity v in the direction of the arrow 5. The tape is exposed to a source of light 6, e.g. a powerful microscope lamp of a source of laser light, in a direction perpendicular to the grid bars and obliquely to the surface of the tape. A light ray 8 encounters the surface of the magnetic tape 1 at a point 7 and is diffracted by the grid 4 towards a detector 9 situated vertically above, as a ray 10 or beam 14. The detector 9 may be, for example, a microscope, optionally with a camera attached so that visual and photographic observation may be carried out simultaneously. If a photographic film is used, its speed of displacement must be coupled with that of the magnetic tape.

The angle between the normal to the layer and the ray 8 is denoted by $\alpha$. In this basic form of construction, it should be noted that the position of the light source 6 and that of the detector 9 are interchangeable, but variations in which the light source and detector are differently situated will be pointed out in the special cases.

The displacement of the magnetic signal carrier does not interfere with the phenomena of diffraction since the velocity of this displacement is negligible compared with the velocity of light.

It was also found that the displacement of the information carrier had no deleterious effect on scanning by diffraction as opposed to scanning by the Kerr or Faraday effect.

The invention may be carried out with information carriers and methods which are new, individually and- /or in combination. These include methods for optically scanning the information carrier and for processing the scanned signal.

Further details of methods of carrying out various scanning processes are discussed below with reference to a grid, used by way of example, which has been obtained by the recording of sine waves with the linear gap of a recording sound head, followed by development with a magnetic liquid without application of external fields. When light is incident perpendicularly on such a grid, the relationship between the angle of diffraction $\alpha$, the wavelength of light $\lambda$ and the recorded wavelength $\Lambda$ is given by:

$$\sin \alpha = k \frac{\lambda}{\Lambda/2}$$

where k is the order of the diffraction maximum and $\Lambda/2$ is the grid constant.

The following observations apply to the case where the grid is scanned with monochromatic light of wavelength $\lambda m$. In order to ensure a unique correlation between the angle of diffraction $\alpha$ and the recorded wavelength $\Lambda$, it is necessary to take into account that as the recorded wavelengths $\Lambda$ pass through any range of wavelengths, the $\alpha$ ranges of the maxima of different orders may overlap. To investigate this effect, we express the recorded half wavelengths $\Lambda/2$ in units of $$\lambda m \left( \frac{\Lambda}{2} = g\lambda m \right)$$

and obtain the equation:

$$\sin \alpha = k/g \ (g = \text{grid constant}).$$

The following Table gives the values of $\sin \alpha$ or $\alpha$ for the diffraction maxima of the first to fourth and tenth order for the case where $\lambda/2$ lies between the single value and the tenfold value of the wavelength of light $\lambda m$ (g = 1 ... 10).

TABLE

| g | | K 1 | 2 | 3 | 4 | ... | 10 |
|---|---|---|---|---|---|---|---|
| 1 | sinα | 1 | 2 | 3 | 4 | | 10 |
|   | α | 90° | | | | | |
| 2 | sinα | ½ | 1 | 3/2 | 2 | | 5 |
|   | α | 30° | 30° | | | | |
| 3 | sinα | ⅓ | ⅔ | 1 | 4/3 | | 10/3 |
|   | α | 19,5° | 42° | 90° | | | |
| 4 | sinα | ¼ | ½ | ¾ | 1 | | 5/2 |
|   | α | 14,5° | 30° | 48,5° | 90° | | |
| ... | | | | | | | |
| 10 | sinα | 1/10 | 1/5 | 3/10 | 2/5 | | 1 |
|    | α | 5/7° | 11,5° | 17,4° | 23,6° | | 90° |

Sin $\alpha$ values greater than 1 are situated above the main diagonals extending from the top left to the bottom right. Such a mathematical impossibility shows that no physical reality exists in this area. The first diffraction maximum (k=1) passes through a range of angles of $5.7° \leq \alpha \leq 90°$ for $1 \leq g \leq 10$. For $g > \lambda$, overlapping occurs with the range of angles of the second diffraction maximum. The Table shows that in the case in which the angle of diffraction of the first maximum is used for reproduction of the recorded wavelength, a unique correlation between the recorded wavelengths and the angle of diffraction is possible only for values between $1 = g = 2$ in a range of angles of $30° \leq \alpha < 90°$. This corresponds to a recorded wavelength situated between $2\lambda m$ and $4\lambda m$. This means that at a wavelength of light of $\lambda m = 0.6$ μm, the recorded wavelength may be between 1.2 and 2.4 μm.

As the order of the diffraction maxima k increases, the range of unique correlation between angle of diffraction and recorded wavelengths shifts along the main diagonals given by 90° and the parallel diagonals below them to greater values of g. It may be seen that this shift is accompanied by a reduction in the range of angles and in the range of wavelengths which can be scanned. For k=2, for example, recorded wavelengths between $\Lambda/2 = 2\lambda m$ and $\Lambda/2 = 3\lambda m$ can be uniquely scanned in a range of angles of $42° \leq \alpha < 90°$.

Variations according to the invention of the conversion of the angle of diffraction into electrical signals will now be described on the basis of these fundamental considerations for scanning by monochromatic light.

1.

According to an embodiment of the invention, a series of sensors which respond only when stimulated by the diffracted ray is arranged in the range of angles provided for scanning. The sensors are preferably electro-optical transducers.

2.

The dependence of the angle of diffraction on the recorded wavelength ($\alpha = f(\Lambda)$) is converted into a dependence of the brightness H on the recorded wavelength ($H = f(\Lambda)$). FIG. 3 illustrates the principle, with the reversal of the positions of detector and light source already mentioned above. The reference numerals have been retained. Detector 9 now consists of a converging lens 11, a neutral wedge 12 and a photoelectric element 13. The diffracted ray 10 passes through the neutral wedge 12. A converging lens system situated either behind or in front of the neutral wedge always focuses the ray 10 to the same point, where a light-sensitive element 13, preferably an electro-optical transducer, is situated.

With one of the systems described above, additional transmission of information, which may be used, for example, for synchronizing signals, can be obtained by varying the intensity of the monochromatic light beam with time according to a given function. This function is synchronised with the course of the recorded signal which produces the optical diffraction. The scanned signal then depends on the wavelength of the recording and the time. One possible method of synchronizing or coupling the two functions consists of controlling the intensity variation of the monochromatic signal by recordings on magnetic tape.

Another possible method of processing information in the beam diffracted by the magnetic tape is similar to that used in holography. The monochromatic beam is replaced by a coherent laser beam. A partial beam is divided from this laser beam to serve as reference beam for the beam diffracted by the magnetic tape. Wave fields are obtained from which the information can be decoded.

Another method uses spectral illumination, e.g. with white light (0.4 ... 0.8 μm). The diffracted light is then observed at a fixed angle. The wavelength $\Lambda$ recorded on the information carrier is then associated with a wavelength $\lambda$ of light from the spectrum (colour separation).

FIG. 4 illustrates this in detail, using the components and reference numerals of FIG. 2. The light source 6 throws the beam 8 of white light on to the grid bars 4 at the point 7. The light disperses at the grid bars 4 to form a cone of coloured light 14. Through a gap 15 in a shutter 16 situated vertically above the point 7, the beam 10 of a particular colour is selected from the cone 14. Behind the gap 15 is a detector 9 (visual observation, photoelectric element) to interpret the selected colour. In this manner, the wavelength Λ recorded on the information carrier is associated with a wavelength λ of light from the diffraction spectrum (colour separation).

$$\Lambda = f(\lambda).$$

In the method described above, it is also necessary to take into account the occurrence of diffractions of various orders. The effect will again be described with reference to a lattice having lattice constant Λ/2 obtained by the recording of sine waves by means of the linear gap of a recording sound head. The following equations apply:

$$\sin \alpha = \frac{k\lambda}{\Lambda/2} = \text{const}$$

and $$\Lambda = \frac{2k\lambda}{\sin \alpha}$$

so that Λ and λ are proportional to each other.

It is now necessary to consider what range of wavelengths $\lambda_1 < \lambda < \lambda_2$ the scanning beam may cover so that at the constant angle α no diffracted light signals which are due to successive orders of diffraction, will enter. This would mean that the same recorded wavelengths Λ cannot be uniquely associated with a particular wavelength of diffracted light. In order that the same wavelength Λ will not be represented by adjacent diffraction maxima at a constant value for sin α, the following relationship must apply:

$$2k\lambda_2 < 2(k+1)\lambda_1 =$$

$$\lambda_2 < \frac{k+1}{k} \lambda_1 \left(1 + \frac{1}{k}\right) \lambda_1$$

If the first diffraction maximum is used, then $$\lambda_2 < 2\lambda_1.$$

This means that if diffraction of the first order is used, only one range of wavelengths can be used, which is defined by:

$$\lambda_1 \leq \lambda < 2\lambda_1.$$

Such a range of wavelengths precisely covers visible light, namely the range from $\lambda_1 = 0.4$ μm to $\lambda_2 0.8$ μm ($2\lambda_1$).

Hence for k=1, the recorded wavelengths can only be scanned in a range given by:

$$\frac{2\lambda_1}{\sin \alpha} \leq \Lambda < \frac{4\lambda_1}{\sin \alpha}$$

By varying the value for sin α, this range may be shifted to greater or smaller values of Λ. Since sin α ≦ 1, the wavelength Λ recorded on the tape must not assume any values lying below the double wavelength of light of the lower limit of the spectrum. It follows that with increase in the order of the diffraction picture used, the range of wavelengths suitable for unique scanning becomes progressively narrower.

One possible method of converting the colour signals into electrical signals consists of arranging a sensor which responds to the wavelengths of light in the position where α = constant. This sensor may be, for example, in the form of a colour filter which transmits colours with varying degrees of intensity. The intensities are then converted into electrical signals by an electro-optical transducer.

This method is also suitable as a basis for two-dimensional reproduction of colour images. The magnetic wavelengths corresponding to the colours are fed to the magnetic signal carrier according to the colour distribution. The colour is reproduced by scanning with white light. This method provides the starting point for a silver-free reproduction of colour images which is achieved directly, without conversion into electrical signals.

Exactly in the same manner as in methods using monochromatic light, a second piece of information may be transmitted by controlling the intensity of the source of light according to this second piece of information. In this manner, the brightness of a point or of a surface may be varied.

The process according to the invention has been discussed up to now in relation to recording sine waves. The invention affords particular advantages in operating with impulse recording. In this case, the magnetic storage material is preferably modulated right up to saturation or beyond. The sharper transitions between antiparallel magnetization directions lead to more pronounced localisation of the leakage fields and hence of the magnetic suspension above the transitions. The edges of the grid and hence also the optical diffraction pattern become sharper. In this form of saturation recording, it is not necessary to start with the magnetic layer in the virgin state. The layer may be saturated in one direction. This state may easily be brought about by means of a permanent magnet. The processes according to the invention which have been described above in relation to their basic principles will now be explained in detail with reference to various methods for depositing and developing the information and various constructions of information carriers.

The information may be deposited by means of a conventional annular recording head. If the recording material is suitable, a special head for vertical magnetization or a light or laser beam may be used for recording. In the latter case, the highly concentrated beam which has a cross-section down to 1 μm², heats specific points to temperatures above the Curie temperature (Curie temperature for $CrO_2$ is 160° C.), and at these points, the direction of magnetization is reversed.

This method is particularly suitable when diffraction images are to be produced from point structures.

Conversion of the information recorded by one of the methods indicated into a diffraction grid may also be carried out by various methods. The grids obtained are reflection grids or transmission grids, depending on the method employed. The following methods are available:

a.

A suspension of soft magnetic particles measuring ca. 0.02 μm is poured on to a hard magnetic storage material carrying the recording. A reflection grid is obtained after evaporation of the liquid. The durability of such an arrangement may be improved by spraying or casting a transparent lacquer over the surface. The lacquer used would be soluble or insoluble according to whether the material is to be used again or a permanent record is required.

b.

In one method of producing a reflection grid, a thin solid top layer (0.5 to 2 μm in thickness) in which soft magnetic particles are embedded in a binder is situated on the hard magnetic storage layer. During or after taking of the recording, the top layer is liquefied by solvents or heat so that the soft magnetic particles can become distributed according to the information recorded in the hard magnetic layer.

c.

According to another method, the pigment particles situated in the surface of the recording material itself, which is made of hard magnetic particles and a soluble lacquer, are used to form the grid. As the surface partly dissolves during or after recording of the information, the accumulations of surface particles in the leakage fields form a grid by deformation of the surface. In order to produce powerful leakage fields and hence sharp grids, it is advantageous to record rectangular impulses on a material having a coercivity field above 35.8 Acm$^{-1}$ and a $B_r/B_s$ value greater than 0.80. The hard magnetic pigments used are preferably Low Noise Pigments, cubic γ-Fe$_2$O$_3$ and metal powder pigments having particle sizes corresponding to those of the ferrofluid solutions. Instead of a soluble lacquer, a substance which becomes liquid when heated, preferably at 40° to 80° C., may be used, in particular waxes such as paraffin.

d.

Lastly, the process which has been described in the art for producing unerasable tapes may be used for the production of reflection and transmission grids. In this case, a suspension containing magnetic particles is applied to the magnetic recording. In contrast with German Pat. No. 1 522 965, not only hard magnetic particles but also soft magnetic particles similar to those of a ferro-fluid may be used. When the suspension had dried, a non-magnetic transparent or opaque backing layer is cast or laminated to the back to produce a transmission grid or reflection grid and this together with the grid layer is then stripped off the original.

The information carriers produced by the various methods have the characteristic that when the magnetic information is erased, the optical information is preserved in the form of the diffraction grid. After this information originally used for forming the grid has been cancelled, fresh information can be recorded on the hard magnetic carrier unless the diffraction grid was produced with soft magnetic particles by method (d).

Any materials suitable for dynamic magnetic storage may be used for carrying out the process according to the invention; these include storage materials consisting of a pigment (γ-Fe$_2$O$_3$, CrO$_2$, barium ferrite, metal powder) and binder lacquer. The pigment may, in particular, be embedded in a soluble lacquer or in wax which becomes liquid when heated. These also include layered systems composed of alternate magnetic and non-magnetic layers as well as homogeneous magnetic layers. All the different types of storage material may be isotropic or anisotropic, and if the materials are anisotropic, the magnetic preferential axes preferably lie in the direction of recording or perpendicular to the surface. Hard magnetic carrier materials of the above composition may be used on which is applied a solid layer of a binder and soft magnetic particles measuring ca. 0.02 μm.

EXAMPLE

Common black-white test images are recorded on a conventional ½" Amateur tape on a video recorder of type VHS. When this recording is being made, the gap of the recording head in the case of adjacent tracks is rotated through an angle of ±7 to a position perpendicular to the track. The test images were produced using a video test image generator.

This recording becomes covered with a suspension of very fine soft magnetic particles of magnetite measuring 0.02μ (ferro-fluids of Klaus Schäfer) to form a layer having a thickness of the order of a few wavelengths of light. The stage at which this thickness is obtained is recognised by the appearance of interference colours. The particles of pigment not bound by the recording are washed off with water.

The video tape prepared as described above is moved at a speed of ca. 5 cm/s over the stand of an ordinary microscope with a magnification of 30 to 100, an the tape is illuminated with the white light from a microscope lamp so that the vertical projection of the light beam into the plane of the tape is perpendicular to the position of the gap of the head and hence perpendicular to the diffraction grid. Since in adjacent tracks the gap of the head is rotated by +7° or −7° from the position perpendicular to the track, this condition can only be fulfilled for every second track.

Using a constant angle α chosen at a value from 45° to close on 90°, a colour change corresponding to the change in recorded wavelengths can be observed as the tape moves over the microscope stage. The wavelengths Λ of the black-and-white image are converted into colour signals of wavelength λ according to the relationship $$\lambda = \frac{\sin \alpha \Lambda}{2 K} = C\Lambda.$$

A strict proportionality is thus obtained between the wavelength of light (colour) and the magnetic wavelength deposited on the information carrier. This provides the precondition for obtaining an optical image directly from a magnetically fixed recording.

We claim:

1. A process for recording and retrieving information of a travelling information carrier including
  a layer having a magnetic pigment embedded in a binder convertible into a liquid state by chemical or thermal action, the volume filling factor of said layer being less than 0.25 μm and the thickness of the layer equal to or less than 2μ, or
  two magnetic layers on a substrate, consisting of a lower layer for receiving the magnetic information having pigment or metal, having a layer thickness less than 10 μm and a coercive field greater than 8

$kAm^{-1}$ and an upper layer, convertible into a liquid state for production of the diffraction structures by the leakage fields of the lower layer, and containing extremely soft magnetic pigment particles and having a coercive field of less than 4 $Acm^{-1}$, comprising the steps of
(a) recording on said magnetizable information carrier in the form of a tape, disc or roller by modulating it during its movement with information areas which in one direction of the information plane are greater than 0.2 μm and smaller than 20 μm;
(b) producing a geometrical structure by the action of the magnetic fields of the recorded information on particles of whose greatest longitudinal dimension is less than 0.1 μm, and
(c) optical scanning said structure, defracting light of wavelength 0.38 to 0.8 μm on the surface of the moving information carrier and producing diffraction images which serve for interpretation of the information.

2. The process as claimed in claim 1, characterised in that recording is carried out using a linear gap so that linear diffraction grids are formed.

3. In the process as claimed in claim 1 forming a reflection grid together with producing said geometrical structure.

4. The process as claimed in claim 3, characterised in that recording on an information carrier takes place thermomagnetically by heating above the blocking or Curie temperature.

5. The process as claimed in claim 4, characterised in that a beam, preferably a laser beam, is used for recording.

6. The process as claimed in claim 5, characterised in that the information carrier is premagnetised in one direction.

7. The process as claimed in claim 1, characterised in that recording on a magnetic information carrier is carried out by a binary process with positive to negative saturation.

8. The process as claimed in claim 1, characterised in that a recording is applied to a magnetic information carrier and is subsequently subjected to a solution of small magnetisable particles which form a structure.

9. The process as claimed in claim 8, characterised in that the structures formed by the particles are fixed by treatment using a bath or by being sprayed with a soluble or insoluble film forming substance.

10. The process as claimed in claim 1, characterised in that after production of the magnetic structural arrangement necessary for diffraction, the magnetic information is erased and fresh information is recorded, and the leakage fields thereby produced are magnetically scanned.

11. The process as claimed in claim 1, characterised in that the information carrier used is a material consisting of a magnetic carrier carrying an original recording, on which carrier movable magnetizable particles are arranged in space at different densities according to the leakage field of the original recording and the resulting layer is subsequently stripped from the carrier which carries the original recording.

12. The process as claimed in claim 1, characterised in that scanning of the diffraction grid is carried out using monochromatic light, in particular, a laser beam.

13. The process as claimed in claim 12, characterised in that when scanning is carried out, the angle of diffraction is determined by light-sensitive elements, in particular by optico-electrical transducers situated in the transverse range of the angle of the diffracted light.

14. The process as claimed in claim 12 characterised in that the process of scanning, the diffracted beam is focussed by an optical system on a point or a line on or at which is situated a light-sensitive element, and in that a neutral wedge is situated in front of the light-sensitive element, whereby different brightness values are associated with the various angles.

15. The process as claimed in claim 12, characterised in that during scanning, the brightness of the monochromatic source of light is controlled by additional information and that the resulting modulation is also used in the process of scanning.

16. The process as claimed in claim 1, characterised in that in the process of scanning, the diffraction structures are exposed to a wide band of spectral light, preferably white light, at a fixed angle and in that the diffraction wavelength is scanned at a fixed angle.

17. The process as claimed in claim 16, characterised in that when white light is used, proportionality exists between the wavelength of light and the magnetic wavelength laid down on the information carrier.

18. The process as claimed in claims 12 or 16, characterised in that when scanning is carried out with monochromatic or white light, only those diffracted wavelengths belonging to the first diffraction maximum are used for playback.

19. The process as claimed in claim 17, characterised in that the upper wavelength $\lambda_2$ of the wavelength range used for scanning is equal to twice the value of the lower wavelength $\lambda_1$ of this range.

20. The process as claimed in claim 19, characterised in that the light used for scanning has wavelengths in the range of from 0.4 μm to 0.8 μm and the recorded wavelength has values in the range of from $$\Lambda = \frac{2 \cdot 0.4}{\sin} \mu m \text{ to } \Lambda = \frac{2 \cdot 0.8}{\sin} \mu m.$$

21. The process as claimed in claim 16, characterised in that a filter which reproduces the scanned colours at a different intensity is used and in that the intensity is converted into an electric signal by an optico-electrical transducer.

22. The process as claimed in claim 18, characterised in that intensity fluctuations of the source of light are used for transmitting additional information.

23. The process as claimed in claim 1, characterised in that a sensor which responds to the wavelength of the diffracted light is used.

24. The process as claimed in claim 1 wherein said pigment consists of isometric particles.

25. The process as claimed in claim 1 wherein the information carrier contains a pigment having a coercive field greater than 24 $kAm^{-1}$.

26. The process as claimed in claim 1 wherein simultaneously recording on said carrier and producing said geometrical structure occurs.

27. The process as claimed in claim 1 including permeating a substrate of the carrier with light and
forming a transmission grid together with producing said geometrical structure.

28. The process as claimed in claim 1 wherein the lower information layer has a magnetically preferred axis perpendicular to the surface of the layer.

* * * * *